United States Patent
Allan et al.

(10) Patent No.: US 10,305,769 B2
(45) Date of Patent: *May 28, 2019

(54) METHOD AND APPARATUS FOR AUGMENTING TWAMP

(71) Applicant: TELEFONAKTIEBOLAGET L M ERICSSON (PUBL), Stockholm (SE)

(72) Inventors: David Ian Allan, San Jose, CA (US); Samita Chakrabarti, Sunnyvale, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,994

(22) Filed: Sep. 27, 2016

(65) Prior Publication Data

US 2017/0019323 A1    Jan. 19, 2017

Related U.S. Application Data

(63) Continuation of application No. 13/798,016, filed on Mar. 12, 2013, now Pat. No. 9,485,165.

(Continued)

(51) Int. Cl.
*H04L 12/26* (2006.01)
*H04L 12/24* (2006.01)
(Continued)

(52) U.S. Cl.
CPC .............. *H04L 43/10* (2013.01); *H04L 41/12* (2013.01); *H04L 45/122* (2013.01); *H04L 45/24* (2013.01); *H04L 45/26* (2013.01); *H04L 45/7453* (2013.01)

(58) Field of Classification Search
CPC ........ H04L 43/10; H04L 41/12; H04L 45/122; H04L 45/24; H04L 45/26; H04L 45/7453
See application file for complete search history.

(56) References Cited

U.S. PATENT DOCUMENTS

2002/0165957 A1    11/2002  Devoe et al.
2003/0115319 A1    6/2003   Dawson et al.
(Continued)

FOREIGN PATENT DOCUMENTS

CN    102307119 A    1/2012
RU    2273958 C2     4/2006
(Continued)

OTHER PUBLICATIONS

Geib, et al., IPPM standard compliance testing, draft-geib-ippm-metrictest-01 , Internet Engineering Task Force, IETF Trust, Oct. 26, 2009, 19 pages.

(Continued)

*Primary Examiner* — Kent K Krueger
(74) *Attorney, Agent, or Firm* — NDWE, LLP

(57) ABSTRACT

According to another embodiment of the invention, TWAMP path discovery is performed to determine a sequence of IP addresses of a forward direction TWAMP E2E path to be traversed by two different TWAMP test sessions between a Sender and a Reflector. Then, additional TWAMP test request packets are transmitted for the different TWAMP test sessions; and TWAMP test reply messages are received responsive to respective ones of the TWAMP test request packets. Responsive to the TWAMP test reply messages, a PM is determined that is specific to the different sequences of IP addresses of the forward direction TWAMP E2E paths traversed by the two different TWAMP test sessions.

18 Claims, 7 Drawing Sheets

Related U.S. Application Data

(60) Provisional application No. 61/737,730, filed on Dec. 14, 2012.

(51) Int. Cl.

| | | |
|---|---|---|
| *H04L 12/733* | (2013.01) | |
| *H04L 12/707* | (2013.01) | |
| *H04L 12/721* | (2013.01) | |
| *H04L 12/743* | (2013.01) | |

(56) References Cited

U.S. PATENT DOCUMENTS

| | | | |
|---|---|---|---|
| 2004/0260755 A1 | 12/2004 | Bardzil et al. | |
| 2006/0072479 A1* | 4/2006 | Loyd | H04L 43/0864 370/254 |
| 2006/0274760 A1* | 12/2006 | Loher | H04M 3/2236 370/395.52 |
| 2010/0265824 A1 | 10/2010 | Chao et al. | |
| 2012/0087235 A1 | 4/2012 | Smith et al. | |
| 2014/0029441 A1 | 1/2014 | Nydell | |
| 2014/0029442 A1 | 1/2014 | Wallman | |

FOREIGN PATENT DOCUMENTS

| | | |
|---|---|---|
| WO | 2012066371 A1 | 5/2012 |
| WO | 2012101464 A1 | 8/2012 |

OTHER PUBLICATIONS

Mizrahi., et al., "An Overview of Operations Administration and Maintenance (OAM) Mechanisms," draft-ieff-opsawg-oam-overview-07.txt, Operations and Management Area Working Group, Internet Draft, IETF, 2012, 28 pages.
RFC 1180: Socolofsky T., et al., "A TCP/IP Tutorial," 1991, 28 pages, Network Working Group, Request for Comments: 1180.
RFC 1644: Braden R., "T/TCP—TCP Extensions for Transactions Functional Specification," 1994, 38 pages, Network Working Group, Request for Comments: 1644.
RFC 2460: Deering S., et al., "Internet Protocol Version 6 (IPv6)," 1998, 39 pages, Network Working Group, Standards Track, Request for comments: 2460.
RFC 2474: Nichols K., "Definition of the Differentiated Services Field (DS Field) in the IPv4 and IPv6 Headers," 1998, 20 pages, Network Working Group, The Internet Society, Request for Comments: 2474.
RFC 2475: Blake S., "An Architecture for Differentiated Services," 1998, 36 pages, Network Working Group, The Internet Society, Request for Comments: 2475.
RFC 2597: Heinanen J., et al., "Assured Forwarding PHB Group," 1999, 11 pages, The Internet Society, Request for comments: 2597.
RFC 2675: Borman D., "IPv6 Jumbograms," 1999, 9 pages, Network Working Group, The Internet Society, Request for Comments: 2675.
RFC 2983: Black D., "Differentiated Services and Tunnels," 2000, 14 pages, Network Working Group, The Internet Society, Request for Comments: 2983.
RFC 2991: Thaler., et al., "Multipath Issues in Unicast and Multicast Next-Hop Selection," 2000, 9 pages, Network Working Group, The Internet Society, Request for Comments: 2991.
RFC 2992: Hopps C., "Analysis of an Equal-Cost Multi-Path Algorithm," 2000, 8 pages, Network Working Group, The Internet Society, Request for Comments: 2992.
RFC 3031: Rosen, et al., "Multiprotocol Label Switching Architecture," Jan. 2001, 61 pages, Request for Comments: 3031.

RFC 3086: Nichols K., et al., "Definition of Differentiated Services Per Domain Behaviors and Rules for their Specification," 2001, 24 pages, Network Working Group, Request for Comments: 3086.
RFC 3140: Black D., et al., "Per Hop Behavior Identification Codes," 2001, 8 pages, Network Working Group, Standards Track, Request for Comments: 3140.
RFC 3246: Davie B., et al., "An Expedited Forwarding PHB (Per-Hop Behavior)," 2002, 16 pages, The Internet Society, Request for Comments: 3246.
RFC 3247: Charny A., et al., "Supplemental Information for the New Definition of the EF PHB (Expedited Forwarding Per-Hop Behavior)," 2002, 24 pages, Network Working Group, The Internet Society, Request for Comments 3247.
RFC 3260: Grossman D., "New Terminology and Clarifications for Diffserv," 2002, 10 pages, Network Working Group, The Internet Society, Request for Comments: 3260.
RFC 3289: Baker F., et al., "Management Information Base for the Differentiated Services Architecture," 2002, 116 pages, Network Working Group, The Internet Society, Request for Comments: 3289.
RFC 3290: Bernet Y., et al., "An Informal Management Model for Diffserv Routers," 2002, 56 pages, Network Working Group, The Internet Society, Request for Comments: 3290.
RFC 3317: Chan K., et al., "Differentiated Services Quality of Service Policy Information Base," 2003, 96 pages, Network Working Group, The Internet Society, Request for Comments: 3317.
RFC 4113: Fenner B., et al., "Management Information Base for the User Datagram Protocol (UDP)," 2005, 19 pages, Network Working Group, The Internet Society, Request for Comments: 4113.
RFC 443: McKenzie A., "Traffic Statistics (Dec. 1972)," 1973, 3 pages, Network Working Group, Request for Comments: 443.
RFC 4443: Conta A., et al., "Internet Control Message Protocol (ICMPv6) for the Internet Protocol Version 6 (IPv6)," 2006, 24 pages, Network Working Group, Standards Track, Request for Comments 4443.
RFC 4594: Babiarz J., et al., "Configuration Guidelines for DiffServ Service Classes," 2006, 57 pages, Network Working Group, Request for Comments: 4594.
RFC 4656: Shalunov S., et al., "A One-way Active Measurement Protocol (OWAMP)," 2006, 56 pages, Network Working Group, The Internet Society, Request for Comments: 4656.
RFC 5357: Heydayat K., et al., "A Two-Way Active Measurement Protocol (TWAMP)," Oct. 2008, 26 pages, Network Working Group, Request for Comments: 5357.
RFC 5405: Eggert L., et al., "Unicast UDP Usage Guidelines for Application Designers," 2008, 27 pages, Network Working Group, IETF Trust, Request for Comments: 5405.
RFC 5865: Baker F., "A Differentiated Services Code Point (DSCP) for Capacity-Admitted Traffic," May 2010, 14 pages, Internet Engineering Task Force (IETF), IETF Trust, Request for Comments: 5865.
RFC 6703: Morton., et al., "Reporting IP Network Performance Metrics: Different Points of View," 2012, 27 pages, IETF, Request for Comments 6703.
RFC 768: Postel, "User Datagram Protocol," Aug. 28, 1980, 3 pages, Network Working Group, Request for Comments: 768.
RFC 792: Postel J., "Internet Control Message Protocol" Darpa Internet Program Protocol Specification, Sep. 1981, 21 pages, Network Working Group, Request for Comments: 792.
RFC 793: Postel J.,"Transmission Control Protocol," Sep. 1981, 91 pages, Darpa Internet Program Protocol Specification, Request for comments: 793.
RFC 955: Braden R., "Towards a Transport Service for Transaction Processing Applications," 1985, 10 pages, Network Working Group, Request for Comments: 955.

\* cited by examiner

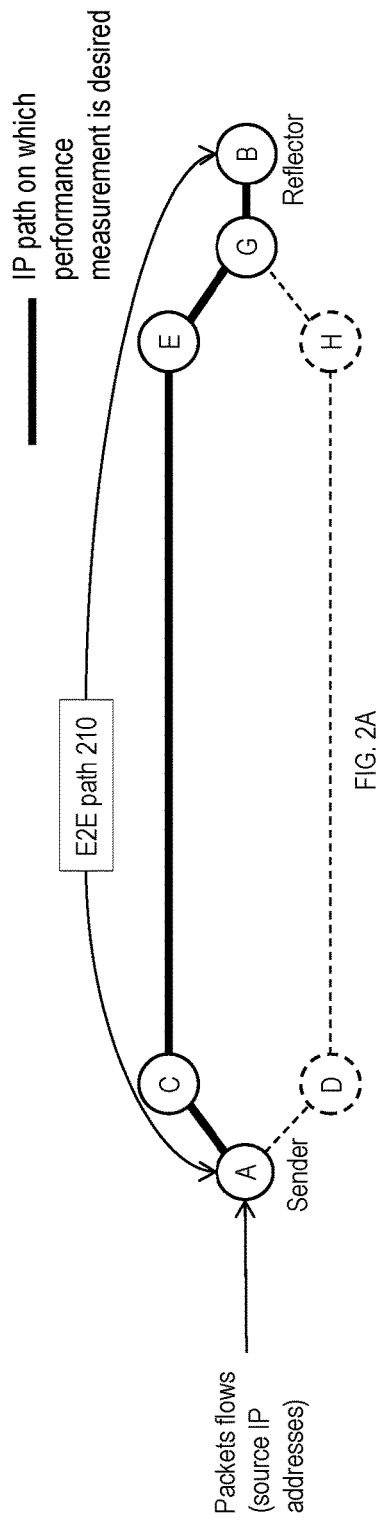
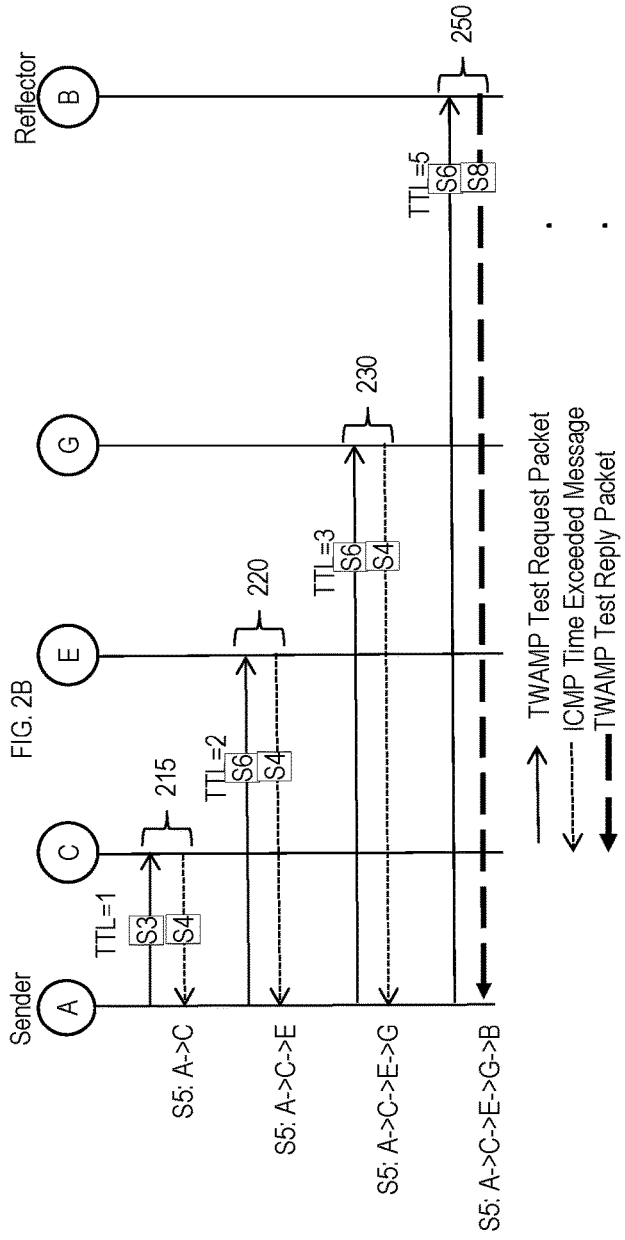
FIG. 2A
FIG. 2B

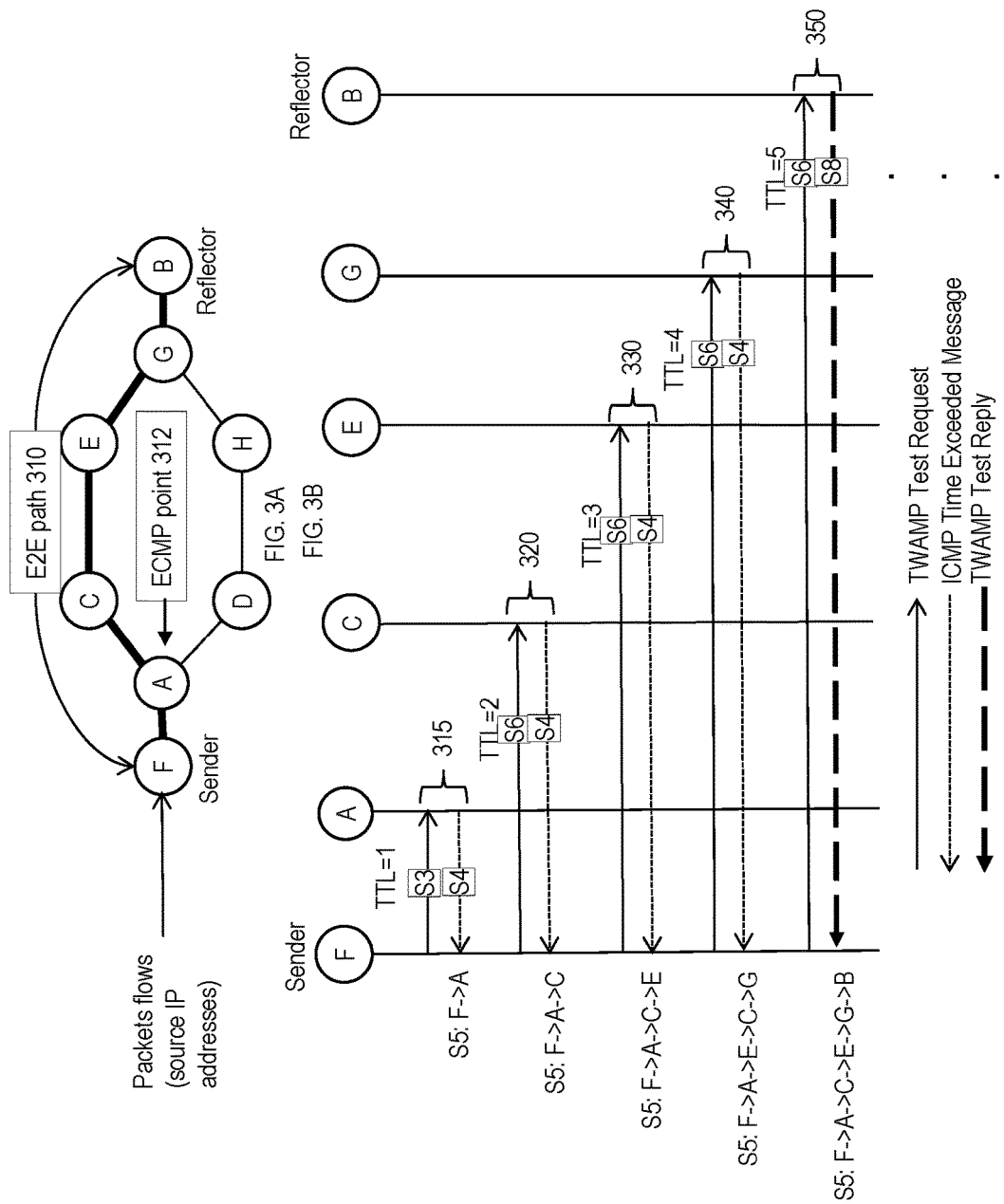

US 10,305,769 B2

METHOD AND APPARATUS FOR AUGMENTING TWAMP

CROSS-REFERENCE TO RELATED APPLICATIONS

This application is a continuation of application Ser. No. 13/798,016, filed Mar. 12, 2013 (now U.S. Pat. No. 9,485,165, issued Nov. 1, 2016), which claims the benefit of U.S. Provisional Application No. 61/737,730, filed Dec. 14, 2012, which is hereby incorporated by reference.

FIELD

Embodiments of the invention relate to the field of networking; and more specifically, to measuring performance.

BACKGROUND

FIG. 1 is a block diagram illustrating Two-Way Active Measurement Protocol (TWAMP) (Request for Comments (RFC) 5357 and 4656 published by the Internet Engineering Task Force (IETF)) being used between two Internet Protocol (IP) end points according to the prior art. Two-Way Active Measurement Protocol (TWAMP) (RFC 5357 and 4656) may be used for end-to-end (E2E) IP performance measurement (PM). In other words, TWAMP measures performance between two IP endpoints. Specifically, TWAMP can measure both two-way and one-way performance (delay, jitter, packet loss, connectivity, re-ordering) at the sender and reflector.

SUMMARY

A method and apparatus for augmenting TWAMP is described. According to one embodiment of the invention, a current hopcount is set to an initial value of one for a TWAMP test session with a destination Internet Protocol (IP) address of another network device. Then, a TWAMP test request packet is transmitted with the destination IP address and with a hopcount in the IP packet set to the current hopcount. If, in response to the transmission, an Internet Control Message Protocol (ICMP) time exceeded message is received from a transit node, then the transit node is the current hopcount away on the TWAMP end-to-end (E2E) path being discovered and the network device: 1) adds an IP address from the ICMP message to a sequence of IP addresses recorded for the TWAMP E2E path; and repeats the transmission with the current hopcount incremented by one as compared to the immediately preceding TWAMP test request packet for this TWAMP test session. If, in response to the transmission, a TWAMP test reply message is received, then it will have been sent from the another network device and the network device: transmits additional TWAMP test request packets for the TWAMP test session and receives TWAMP test reply messages responsive to respective ones of the TWAMP test request packets; and 2) determines, responsive to the TWAMP test reply messages, a PM that is specific to the sequence of IP addresses of the forward direction TWAMP E2E path traversed by the TWAMP test session.

According to another embodiment of the invention, TWAMP path discovery is performed to determine a sequence of IP addresses of a forward direction TWAMP E2E path to be traversed by two different TWAMP test sessions between a Sender and a Reflector. Then, additional TWAMP test request packets are transmitted for the different TWAMP test sessions; and TWAMP test reply messages are received responsive to respective ones of the TWAMP test request packets. Responsive to the TWAMP test reply messages, a PM is determined that is specific to the different sequences of IP addresses of the forward direction TWAMP E2E paths traversed by the two different TWAMP test sessions.

According to another embodiment of the invention, the following in the network device acting as Sender for each of a plurality of TWAMP test sessions each having a destination Internet Protocol (IP) address of a same Reflector more than one hopcount away: 1) transmitting, to the destination IP address, a series of TWAMP test request packets with hopcounts starting at 1 and increasing until a TWAMP test reply message is received; 2) receiving respective Internet Control Message Protocol (ICMP) time exceeded messages responsive to each of the TWAMP test request packets transmitted with hopcounts that are less than the number of hopcounts required to reach the Reflector; and 3) receiving, from another network device acting as the Reflector of the forward direction TWAMP E2E path, the TWAMP test reply message. Each of the ICMP time exceed messages identify an IP address along a forward direction TWAMP E2E path for that TWAMP test session. In addition, two different forward direction TWAMP E2E paths are distinguished between the network device acting as the Sender and the another network device acting as the Reflector by the different sequences of IP addresses along those forward direction TWAMP E2E paths.

BRIEF DESCRIPTION OF THE DRAWINGS

The invention may best be understood by referring to the following description and accompanying drawings that are used to illustrate embodiments of the invention. In the drawings:

FIG. 2A is a block diagram illustrating exemplary networks according to embodiments of the invention;

FIG. 2B is a transactional diagram showing the TWAMP messages between the sender and other nodes of the exemplary networks from FIG. 2A used for TWAMP path discovery, according to embodiments of the invention;

FIG. 3A is a block diagram illustrating a third exemplary network;

FIG. 3B is a transactional diagram showing the TWAMP messages between the sender and other nodes of the exemplary network from FIG. 3A used for TWAMP path discovery, according to embodiments of the invention;

DESCRIPTION OF EMBODIMENTS

Figure 1:
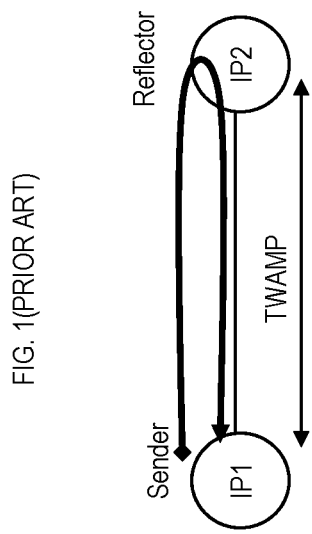
FIG. 1 is a block diagram illustrating Two-Way Active Measurement Protocol (TWAMP) (Request for Comments (RFC) 5357 and 4656 published by the Internet Engineering Task Force (IETF)) being used between two Internet Protocol (IP) end points according to the prior art.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (or pathing—also known as multipath forwarding or IP multipath) (ECMP) (RFC 2991 and 2992) may be used and typical implementations use as the criteria particular header fields to ensure that the packets of a particular packet flow are always forwarded on the same next hop to preserve packet flow ordering. For purposes of multipath forwarding, a packet flow is defined as a set of packets that share an ordering constraint. As an example, the set of packet in a particular TCP transfer sequence need to arrive in order, else the TCP logic will interpret out of order delivery as congestion and slow the TCP transfer rate down.

Overview

Unfortunately, the TWAMP protocol running on a TWAMP end point (sender or reflector) has no authoritative knowledge of the links and transit nodes (also known as intermediate nodes) traversed on a path between the sender and reflector for a given packet flow in an IP routed network; policy, multi-area, ECMP, proprietary routing implementations etc. limit the a priori knowledge of path that a node can glean from the routing system. Certain embodiments of the invention use TWAMP Path discovery to discover additional granularity regarding such paths; such as a sequence of IP addresses of network interfaces of network devices traversed. Such TWAMP path discovery is typically authoritative; and even if such information could be centrally obtained and modeled, it is still faster to discover the path and allows for an automatic reaction to performance degradation. In addition to TWAMP Path discovery, certain embodiments of the invention provide TWAMP PMs at a more granular level by distinguishing different TWAMP E2E paths between the Sender and Reflector by sequence of IP addresses as learned from TWAMP path discovery.

To cause a given TWAMP test request packet (also referred to as a TWAMP request-session message or TWAMP Sender Probe) to traverse a particular path, the Sender places values in header fields (e.g., differentiated services (DSCP) values (RFC 2474, 2475, 2597, 2983, 3086, 3140, 3246, 3247, 3260, 4594, 5865, 3289, 3290, and 3317), source IP addresses of Sender A, destination IP address, source port (where "source port" refers herein to a protocol port, as opposed to a physical port of a network device), destination port (where "destination port" refers herein to a protocol port, as opposed to a physical port of a network device) is TWAMP, transport protocol (e.g., user datagram protocol (UDP) (RFC 768, 2460, 2675, 4113, and 5405), Transmission Control Protocol (TCP) (RFC 793 and 1180)) either selected arbitrarily to exercise a specific known path, or expected to cause the TWAMP test request packet to traverse (to be routed) on the path (to the Reflector) taken by a particular customer packet flow under the circumstances where the Sender has sufficient information about the network to know what selected values will produce forwarding behavior corresponding to that of the customer packet flow.

Multiple TWAMP test sessions may be initiated by a single sender. Embodiments of the invention allow for these different TWAMP test sessions to be initiated and/or to follow different multipath permutation through the network.

TWAMP Trace (Path Discovery)

FIG. 2A is a block diagram illustrating exemplary networks according to embodiments of the invention. The exemplary network includes nodes labeled A, B, C, E, and G (and optionally nodes D and H), each of which is a node implemented on a different network device. FIG. 2A also shows lines representing links interconnecting different ones of these nodes (A to C, C to E, E to G, and G to B; and in the illustrated option, A to D, D to H, and H to G), and thus the different network devices on which those nodes are implemented.

In the optional network that includes nodes D and H, node A may make forwarding decisions between next hop C and D. As discussed above, such a next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, ECMP may be used and typical implementations use as the criteria particular header fields to ensure that the packets of a particular packet flow are always forwarded on the same next hop to preserve packet flow ordering.

In FIG. 2A, node A (source node) is acting as the sender, for purposes of the TWAMP protocol, of an end to end (E2E) path 210 with node B as the reflector (destination node). Sender A initiates TWAMP test request packets (which are individually also referred to as a TWAMP test request packet, a TWAMP request-session message or TWAMP Sender Probe).

Embodiments of the invention perform TWAMP path discovery to discover (trace) the path that TWAMP messages traverse in a forward direction (that is, from the Sender to the Reflector). In one embodiment, the follows steps are performed:

S1. Receive indication to turn on TWAMP PM (e.g., for a given packet flow, between an IP address of the Sender and an IP address of the Reflector)

S2. Select the content of the TWAMP Test Request Packet (e.g., source IP address, source port, destination IP address, destination port, transport protocol; by way specific example, when the indication is to turn on TWAMP PM for a given packet flow, the Sender places values in header fields expected to cause the TWAMP test request packet to traverse the same path to the Reflector as the given packet flow as described above; and by way of another specific example, when the indication is to turn on TWAMP between an IP address of the Sender and an IP address of the Reflector, the destination port is TWAMP and the Sender picks DSCP, source port, and transport protocol).

S3. Send the TWAMP Test Request packet with time to live (ttl) or hopcount=1 in the IP packet (set setsockopt or other method to set this value). Generally, a TWAMP test request packets is received by a network device on a network interface that decrements the TTL.

S4. If the destination is more than the hopcount away, TTL will exhaust at a "transit node" resulting in the Sender receiving an Internet Control Message Protocol (ICMP) (RFC 792 and RFC 443) "time exceeded" message from the 'transit node' in the path (thus, a "transit node" is a node between the sender and reflector), and this ICMP time exceed message will include in its source IP address field: 1) an IP address of the network interface on which the TWAMP test request packet was received by the transit node (also known as the network interface of arrival for the packet) if that network interface decremented TTL to exhaustion and that network interface is connected to a numbered interface; or 2) a nodal loopback address of the transit node if the network interface, on which the TWAMP test request packet was received by the transit node and that decremented TTL to exhaustion, is connected to an unnumbered interface. In other words, for such a TTL exhaust event, the most specific IP address available is used for the source IP address of the ICMP time exceeded message.

S5. Sender records the source IP address from the ICMP time exceeded message in the sequence of the IP addresses for the TWAMP E2E path in a TWAMP path table S6. Sender again sends to the destination (Reflector) the TWAMP test request packet, but with its hopcount incremented by 1 as compared to the immediately preceding TWAMP test request packet for this TWAMP test session, S7. Repeat steps 4-6 until it receives the TWAMP reply back from the reflector, and this TWAMP reply will include an IP address of the Reflector.

S8. Sender records the IP address for the sequence for the TWAMP E2E path in the TWAMP path table (e.g., adding the Reflector's IP address from the TWAMP reply to the sequence of IP addresses; in the embodiments that use a TWAMP path table indexed by destination, this may have already been performed when the entry for the TWAMP E2E path was created in the TWAMP path table; in embodiments that store the sequence of IP addresses in a temporary location during discovery, the entry for the TWAMP E2E path in the TWAMP path table may be created at this point and such information stored therein) and commences measuring the performance characteristics of the path to determines a PM. Thus, TWAMP path discovery yields a sequence of IP addresses along a forward direction (from the Sender to the Reflector) TWAMP E2E path, where each IP address is: 1) the IP address of the network interface on which the TWAMP test request packet was received, that decremented TTL to expiration/exhaustion, and that is connected to a numbered interface; 2) a nodal loopback address of the transit node because the network interface on which the TWAMP test request packet was received and that decremented TTL to expiration/exhaustion is connected to a numbered interface; or 3) an IP address of the destination (if the hop count did not expire and the frame terminated at the node or network interface identified by the destination IP address). Thus, each of the IP addresses in the sequence of IP addresses, directly or inferentially, identifies a network device, directly in the case of a loopback address of a physical node and inferentially in the cases where that IP address is a loopback address of a virtual node or assigned the network interface on which the TWAMP test request message was received (be it one assigned a physical network interface, or a virtual network interface assigned to a physical or virtual node implemented on that network device). Since the sequence of IP addresses identifies a sequence of network interfaces, and such network interfaces identify the links traversed, the sequence of IP addresses indirectly identifies links between the network interfaces assigned to those IP addresses (and thus, a sequence of links traversed between the network devices on which those network interfaces are implemented). The sequence of IP addresses will not include IP addresses of network interfaces that do not decrement IP TTL or have been administratively configured not to generate ICMP messages and/or do not support TWAMP Reflector functionality.

S9. Sender continues to send TWAMP Test Request packets, receive TWAMP test Reply packets, and complete the required PMs of the TWAMP E2E path.

Figure 6:
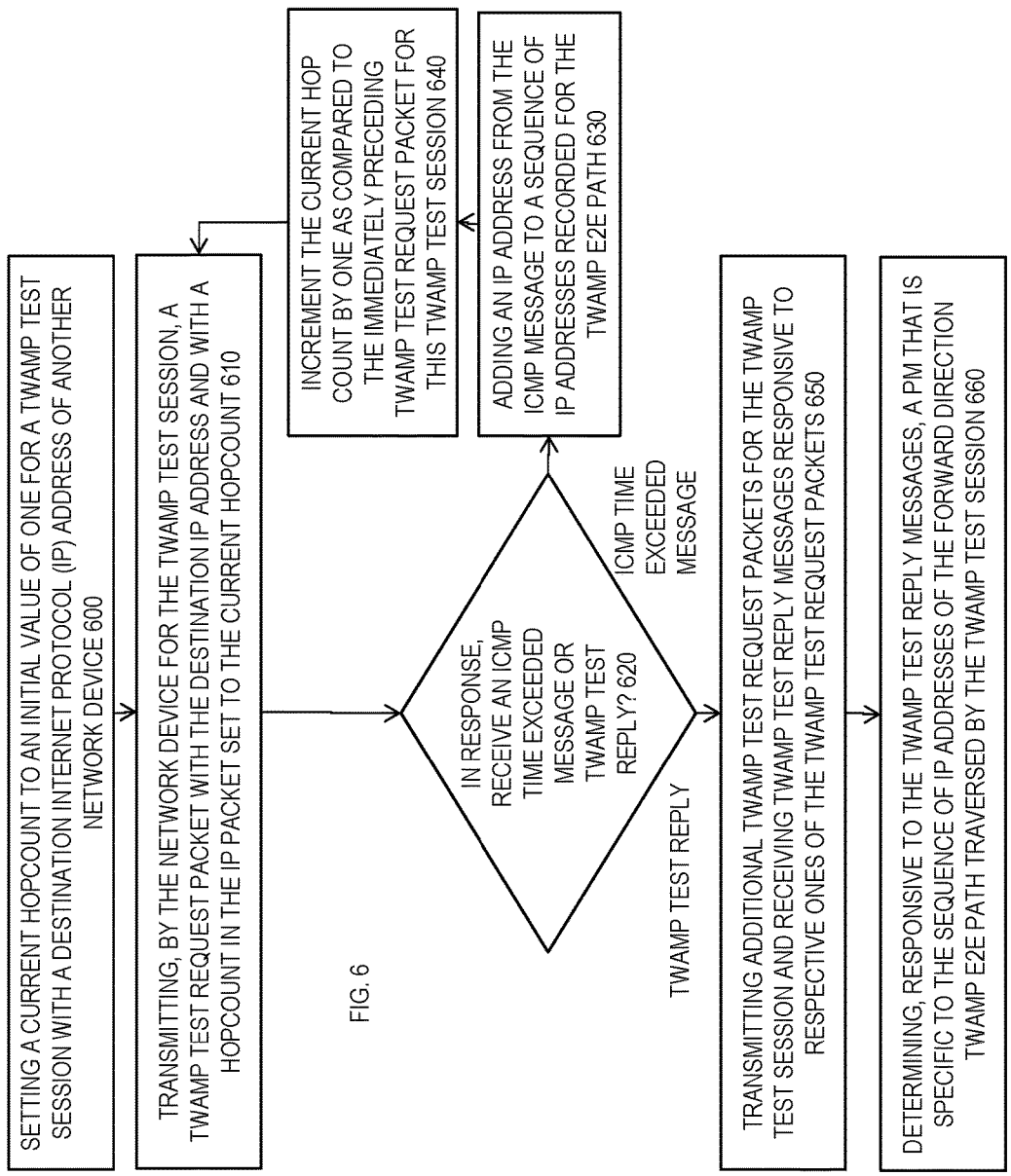
FIG. 6 is a flow diagram illustrating TWAMP path discovery according to embodiments of the invention.

FIG. 6 is a flow diagram illustrating TWAMP path discovery according to embodiments of the invention, and is a representation of the above steps. The flow diagram begins with a network device setting a current hopcount to an initial value of 1 for a TWAMP test session with a destination Internet Protocol (IP) address of another network device (block 600, which is part of S3 above). Next, the flow diagram shows transmitting, by the network device for the TWAMP test session, a TWAMP test request packet with the destination IP address and with a hopcount in the IP packet set to the current hopcount (block 610, which is part of S3 above). This is followed by determining if an ICMP time exceeded message or TWAMP test reply is received in responsive to the TWAMP test request packet (block 620). If an ICMP time exceed message is received (S4 above), then the flow includes adding an IP address from the ICMP message to a sequence of IP addresses recorded for the TWAMP E2E path (block 630, which is S5 above) and incrementing the current hop count by one as compared to the immediately preceding TWAMP test request packet for this TWAMP test secession (block 640, which is part of S6 above) before returning to block 610 (which is the rest of S6). If instead a TWAMP test reply is received, then the Sender has captured the forward path information and the flow diagram includes the following (which are S9 above): 1) transmitting additional TWAMP test request packets for the TWAMP test session and receiving TWAMP test reply messages responsive to respective ones of the TWAMP test request packets (650); and 2) determining, responsive to the TWAMP test reply messages, a PM that is specific to the sequence of IP addresses of the forward direction TWAMP E2E path traversed by the TWAMP test session (660).

FIG. 2B is a transactional diagram showing the TWAMP messages between the sender and other nodes of the exemplary networks from FIG. 2A relative to the steps described above for TWAMP path discovery, according to embodiments of the invention. FIG. 2B shows nodes A, C, E, G, and B from FIG. 2A in that order across the top of FIG. 2B, where node A is the sender and node B is the reflector. When the above described method reaches step 3 (S3), node A transmits to node B a TWAMP test request packet with TTL=1. Since the destination node B is more than the hopcount TTL=1 away, the packet only makes it to node C and at step 4 (S4) node C transmits back to node A an ICMP "time exceeded" message. These two messages are labeled as 215 in FIG. 2B. In response, step 5 (S5) has node A adding an IP address of node C to the sequence for this path in the TWAMP path table maintained by node A.

Then, in step 6 (S6) node A transmits to node B a TWAMP test request packet with TTL=2. Since the destination node B is more than the hopcount TTL=2 away, the packet only makes it to node E which is not the reflector (node B). Thus, step 7 (S7) results in flow returning to step 4 (S4) where node E transmits back to node A an ICMP "time exceeded" message. These two messages are labeled as 220 in FIG. 2B. S5 results in an IP address of node E being added to the sequence for this path (A→C→E).

This process is repeated for nodes A to G and the pair of messages is labeled 230. Then, node A performs S6 again by transmitting to node B a TWAMP test request packet with TTL=5. This time, the message reaches node B because it is hopcount TTL=5 away. Thus, at step 7 (S7), node B acting as the reflector transmits back to node A a TWAMP test reply message. These two messages are labeled as 250 in FIG. 2B. Step 8 (S8) results in node B being added to the sequence for this path (A→C→E→G→B).

This path information may be used for a variety of purposes. For example, it may be reported to a Network Management System. Another example is described below.

FIG. 3A is a block diagram illustrating a third exemplary network. The exemplary network is the same as that shown in FIG. 2A, except: 1) a node F is added in-front of and with a link to node A; 2) node F is the Sender instead of node A; 3) as before, node F can initiate packet flows and/or receive from other nodes (not shown) packet flows): 4) node F (source node) is acting as the sender, for purposes of the TWAMP protocol, of an end to end (E2E) path 310 with node B as the reflector (destination node); and 5) nodes A is acting as an ECMP point 312.

FIG. 3B is a transactional diagram showing the TWAMP messages between the sender and other nodes of the exemplary network from FIG. 3A relative to the steps described above for TWAMP path discovery, according to embodiments of the invention. FIG. 3B shows nodes F, A, C, E, G, and B from FIG. 3A in that order across the top of FIG. 3B, where node F is the sender and node B is the reflector. When the above described method reaches step 3 (S3), node F transmits to node B a TWAMP test request packet with TTL=1. Since the destination node B is more than the hopcount TTL=1 away, the packet only makes it to node A and at step 4 (S4) node A transmits back to node F an ICMP "time exceeded" message. These two messages are labeled as 315 in FIG. 3B. In response, step 5 (S5) has node F adding an IP address of node A to the sequence for this path in the TWAMP path table maintained by node F.

Then, in step 6 (S6) node F transmits to node B a TWAMP test request packet with TTL=2. Since the destination node B is more than the hopcount TTL=2 away, the packet only makes it to node C which is not the reflector (node B). Thus, step 7 (S7) results in flow returning to step 4 (S4) where node C transmits back to node F an ICMP "time exceeded" message. These two messages are labeled as 320 in FIG. 3B. S5 results in an IP address of node C being added to the sequence for this path (F→A→C).

This process is repeated for nodes F to E and F to G, and the respective pairs of messages are labeled 330 and 340. Then, node F performs S6 again by transmitting to node B a TWAMP test request packet with TTL=5. This time, the message reaches node B because it is hopcount TTL=5 away. Thus, at step 7 (S7), node B acting as the reflector transmits back to node F a TWAMP test reply message. These two messages are labeled as 350 in FIG. 3B. Step 8 (S8) results in node B being added to the sequence for this path (F→A→C→E→G→B).

While FIGS. 2-3 illustrate a few exemplary networks, it should be understood that the invention is applicable to networks of arbitrary topologies (e.g., including ones with more links, more nodes, and more paths, as well as ones where the paths does not converge at node G, but rather there are multiple nodes from which final hops to node B can be made).

Exemplary Network Device to Perform TWAMP Path Discovery and/or TWAMP PMs at a more Granular Level Path discovery for two different TWAMP test sessions between the same Sender and Reflector that overlap in time (e.g., TWAMP path discovery may be occurring at substantially the same time for the two TWAMP test sessions, TWAMP path discovery may be complete and performance measurement in process for a first of the TWAMP test sessions, when TWAMP path discovery for the second TWAMP test session begins) and are occurring in a stable network (no faults have cause changes in the relevant network topology) may yield two different sequences of IP addresses, and thus two different forward direction TWAMP E2E paths. This can occur because a node along the two different TWAMP E2E paths is a router, and is making a different next hop decision for the two TWAMP test sessions where these different next hop decisions yield different sequences of IP addresses in the different TWAMP E2E paths discovered for those TWAMP test sessions. This can also occur due to ECMP forwarding; in which case a node acting as an ECMP point makes a different next hop decision for the two TWAMP test sessions that results in two different sequences of IP addresses being discovered. This can also occur due to Layer 3 (L3) Link Aggregation (LAG) link, where an L3-LAG link is a link directly connecting to network devices with multiple IP-addressed link paths (each link path is assigned a different IP address), and a load distribution decision across these different link paths is performed at the data forwarding plane; in which case, a different load distribution decision for the two TWAMP test sessions results in two different sequences of IP addresses being discovered. The above exemplary types of occurrences (router, ECMP forwarding, L3-LAG link) are generally referred to herein as "IP-address based packet flow decisions," and the resulting TWAMP E2E paths generally referred to herein as "IP-address based packet flow paths." As indicated above, certain embodiments of the invention may provide TWAMP PMs at a more granular level by distinguishing different TWAMP E2E paths between the Sender and Reflector by sequence of IP addresses as learned from TWAMP path discovery.

Figure 4:
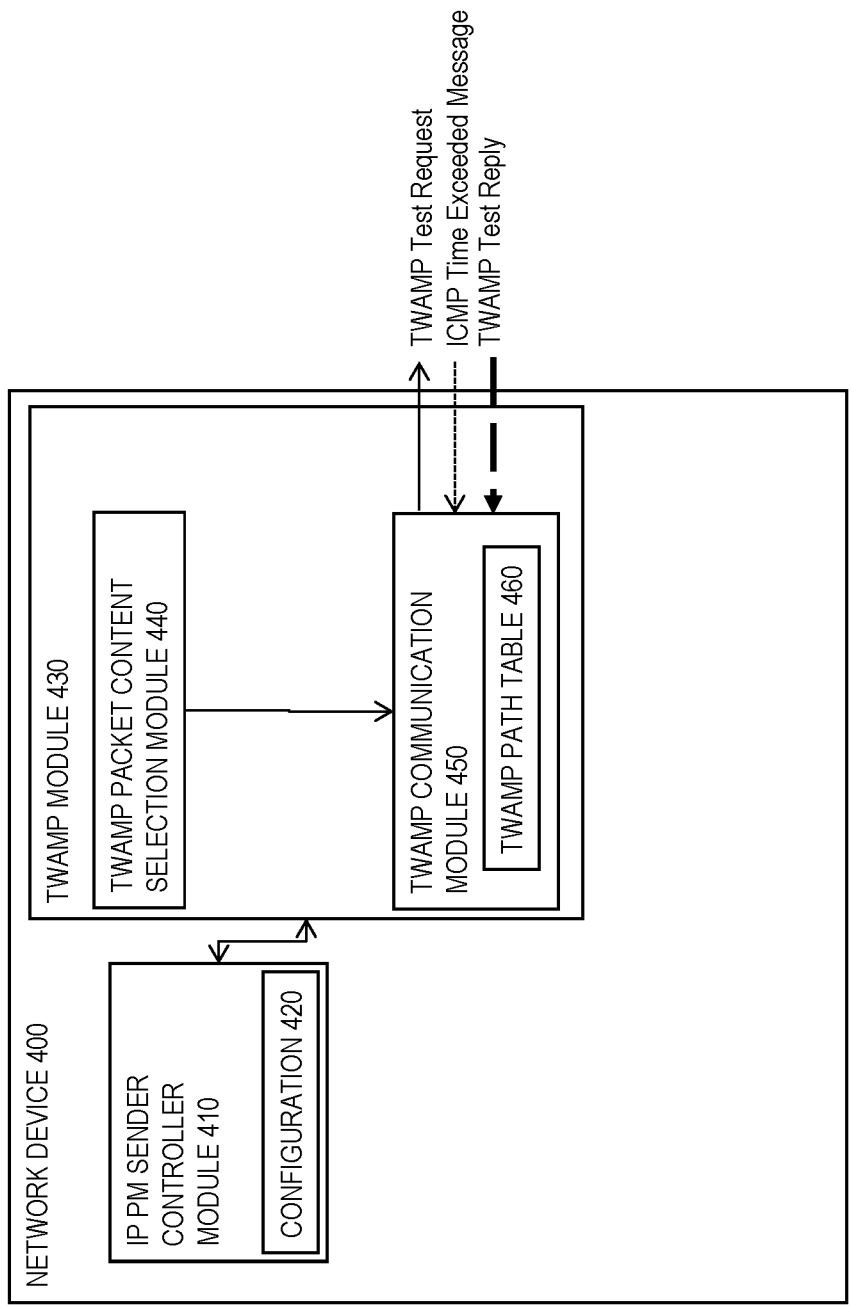
FIG. 4 is a block diagram illustrating various modules in a network device according to certain embodiments of the invention.

FIG. 4 is a block diagram illustrating various modules in a network device according to certain embodiments of the invention. In one embodiment of the invention, a network device has a configuration option for TWAMP to measure PM granularity based on a particular destination (reflector) IP address (in one embodiment, this option would be communicated to an IP PM Sender controller module 410 as part of configuration 420 in the network device 400; and as previously described, embodiments of the invention support turning on TWAMP to measure PM granularity by, for example, identifying in the configuration: 1) a given customer packet flow for which a proxy TWAMP flow is required; or 2) a source IP address and a destination IP address. In one embodiment, for each TWAMP test session, the content to include in the TWAMP test request packets (e.g., DSCP values, source IP address, source port, destination IP address, destination port, transport protocol) is determined by a TWAMP packet selection content module 440, which content is provided to a TWAMP communication module 450. For each TWAMP test session, the TWAMP communication module 450 generates and causes the transmission of the TWAMP test request packets, and is provided the TWAMP test reply messages. The TWAMP communication module 450 provides the PM related information to the IP PM Sender controller module 410, which may perform a variety of actions with it.

In one embodiment that distinguishing different TWAMP E2E paths between the Sender and Reflector by sequence of IP addresses traversed as learned from TWAMP path discovery, the TWAMP communication module 450 performed the above described TWAMP path discovery method (to send/receive the above describe messages, including the ICMP time exceeded message, and maintain a TWAMP path table 460 storing the discovered sequences for each path). In one embodiment, the TWAMP path discovery may be rerun at certain configured intervals as determined by the configuration/implementation (in one embodiment, such intervals are part of configuration 420 and the IP PM Sender controller module 410 tracks the intervals and initiates the TWAMP communication module 430 to redo the TWAMP path discovery for a given TWAMP test session). In one embodiment, for a given TWAMP test session, the TWAMP path table 460 initially stores the TWAMP packet content (e.g., source IP address, source port, destination IP address, destination port, transport protocol); and then the sequence of discovered IP addresses is added. This mapping/tracking of TWAMP test sessions to TWAMP E2E paths allows for PM information to be mapped/tracked and provided at this added level of network granularity. Since PM information is provided on a per TWAMP test session basis, the PM information sent to the IP PM sender controller module 410 is per TWAMP test session; and the IP PM controller module 410 has access to and can report on a per TWAMP test session basis the discovered TWAMP E2E path and PM information; and where separate TWAMP test sessions reflect different TWAMP E2E IP paths between the same Sender and Reflector, the PM information will be specific to those different TWAMP E2E paths between the same Sender and Reflector. It can also correlate the results from different test sessions that have partially overlapping path routing to achieve measurement granularity to the link level (that is, some path measurements will have links in common with other measurements, and some embodiments may use combinatorial analysis to sort out the common and discreet path components).

Different embodiments of the invention may store the above discussed TWAMP E2E paths by a key (e.g., a TWAMP test session ID and/or a TWAMP test session key). The TWAMP test session ID may be based on, for example, the TWAMP test request packet's source IP address, destination IP address, source port, destination port, transport protocol, and differentiated services (DSCP) (RFC 2474, 2475, 2597, 2983, 3086, 3140, 3246, 3247, 3260, 4594, 5865, 3289, 3290, and 3317)).

Figure 5:
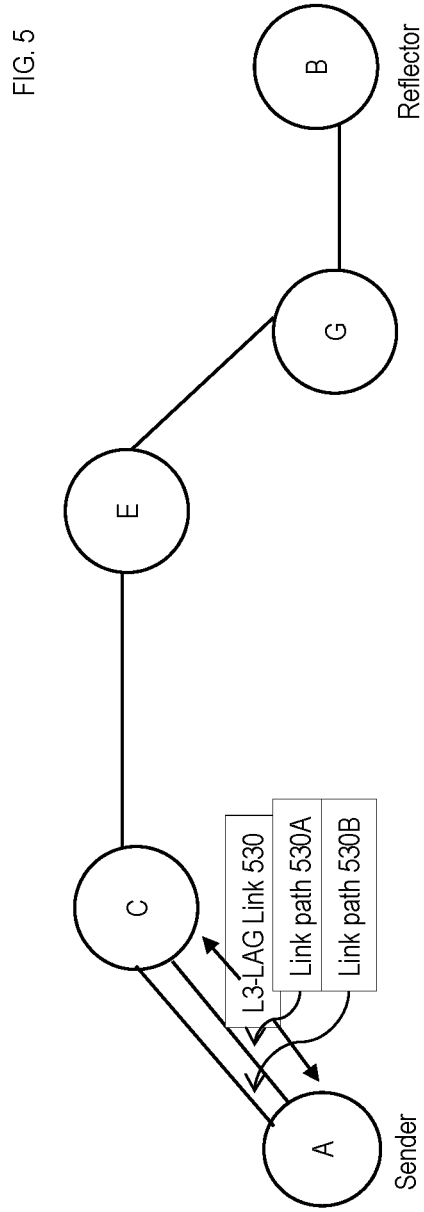
FIG. 5 illustrates a fourth exemplary network according to embodiments of the invention.

FIG. 5 illustrates a fourth exemplary network according to embodiments of the invention. FIG. 5 is the same as FIG. 2A, except A and C are connected by an L3-LAG link 530 that aggregates two link paths (link path 530A and link path 530B). The above described technique can distinguish two different TWAMP E2E paths, where one such TWAMP E2E path takes link path 530A from node A to reach node C (and thus its sequence of nodes will include an IP address of a network interface associated with link path 530A), while the other takes link path 530B (and thus its sequence of nodes will include an IP address of a network interface associated with link path 530B, which is different from that for link path 530A); that is, a different load distribution decision for the two TWAMP test sessions results in two different sequences of IP addresses being discovered. While FIG. 5 shows a single L3-LAG directly connecting Sender A and node C, it should be understood that the invention is applicable to networks of arbitrary topologies (e.g., including ones with more link paths, more L3-LAG links, more nodes, and more paths; as well as ones where the L3-LAG links is not directly connected to the Sender, including between two transit nodes or between a transit node the Reflector).

Figure 7:
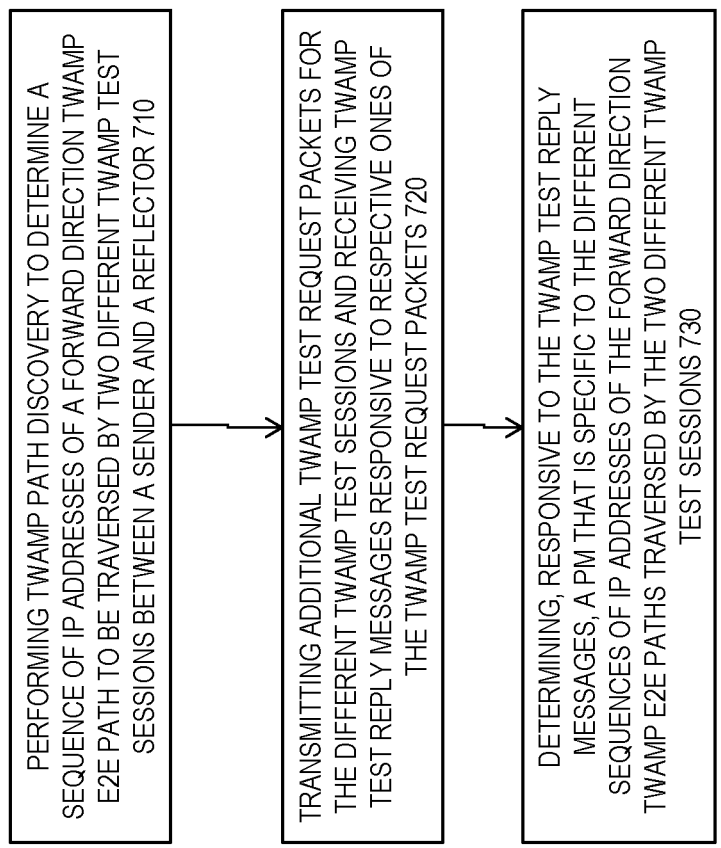
FIG. 7 is a flow diagram for providing TWAMP PMs at a more granular level by distinguishing different TWAMP E2E paths between the Sender and Reflector by sequence of IP addresses as learned from TWAMP path discovery.

FIG. 7 is a flow diagram for providing TWAMP PMs at a more granular level by distinguishing different TWAMP E2E paths between the Sender and Reflector by sequence of IP addresses as learned from TWAMP path discovery. In block 700, the flow diagram includes performing TWAMP path discovery to determine a sequence of IP addresses of a forward direction TWAMP E2E path to be traversed by two different TWAMP test sessions between a Sender and a Reflector (block 700). This is followed by transmitting additional TWAMP test request packets for the different TWAMP test sessions and receiving TWAMP test reply messages responsive to respective ones of the TWAMP test request packets (block 710). Then, the flow diagram show determining, responsive to the TWAMP test reply messages, a PM that is specific to the different sequences of IP addresses of the forward direction TWAMP E2E paths traversed by the two different TWAMP test sessions (block 720).

Thus, in the prior art, TWAMP is unaware of, for example, the LAG/ECMP in an E2E path; and thus TWAMP cannot measure PM for different IP-address based packet flow paths. Embodiments of the invention provide finer granularity of the measurements of IP performance, including over ECMP and L3-LAGs. Different embodiments may use this finer granularity information to improve performance-aware routing and/or traffic engineering (e.g., based on the measurement on a given path, a trigger can be sent to change the quality of service (QoS) of the path, allocate more bandwidth, and/or add more L3-LAG paths or ECMP paths for load balancing). For instance, the network device may: 1) report TWAMP measurements per discovered TWAMP E2E paths; 2) report a mapping of path policy/weight against the measurement value; 3) based on the measurement value on different paths, the system may decide to adjust load on each or any measured paths; and/or 4) report the nodes in each route path.

Common Network Device Components

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network devices to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network device can store one or more bridging tables that are used to forward data based on the layer 2 information in this data.

Typically, a network device includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network device through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Nodes implemented on such a network device may run TWAMP (e.g., on the control plane); ECMP (which, for example, may be implemented in software and/or hardware (e.g., an ASIC) on the data plane) is how the data plane of such a network device can respond to a routing protocol generated forwarding solution offering more than one next hop on a shortest path.

Alternative Embodiments

For example, while the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device for performing Two-Way Active Measurement Protocol (TWAMP) based path discovery on a TWAMP end-to-end (E2E) path between a sender and a reflector of a TWAMP test session, the method comprising:
    setting a current hopcount to a current value for the TWAMP test session;
    transmitting, by the network device that is the sender for the TWAMP test session, a TWAMP test request packet to the reflector, the TWAMP test request packet having a destination IP address for the reflector and with the current hopcount;
    receiving, by the network device, an Internet Control Message Protocol (ICMP) time exceeded message from a transit node on the TWAMP E2E path;
    determining that the transit node is the current hopcount away from the network device on the TWAMP E2E path; and
    storing an IP address of the transit node received in the ICMP time exceeded message in a sequence of IP addresses in an entry of a path table where each of a set of alternate TWAMP E2E paths are separate entries, the sequence of IP addresses representing a forward direction path in the set of alternate TWAMP E2E paths to the reflector, the set of alternate TWAMP E2E paths including the TWAMP E2E path.

2. The method of claim 1, further comprising:
    transmitting another TWAMP test request packet with the current hopcount incremented by one as compared to the TWAMP test request packet; and
    storing another IP address of another transit node received in another ICMP time exceeded message to the sequence of IP addresses representing the forward direction path in the set of alternate TWAMP E2E paths including the TWAMP E2E path.

3. The method of claim 1, wherein the transmitting includes the network device making a routing decision between two other nodes for a first hop, wherein the routing decision is Equal Cost Multi Path (ECMP) based.

4. The method of claim 1, wherein one IP address in the sequence of IP addresses is of a network device acting as an Equal Cost Multi Path (ECMP) point using IP based hashing to make forwarding decisions.

5. The method of claim 3, further comprising:
    varying a source port of for a set of TWAMP test request packets to discover each ECMP path between the sender and reflector.

6. The method of claim 1, further comprising:
    varying the current hopcount and source port of each TWAMP test packet to discover each node of each ECMP path between the sender and reflector.

7. A network device configured to perform Two-Way Active Measurement Protocol (TWAMP) based path discovery on a TWAMP end-to-end (E2E) path between a sender and a reflector of a TWAMP test session, the network device comprising:
    a non-transitory machine-readable storage device having stored therein a TWAMP communication module; and
    a processor coupled to the non-transitory machine-readable storage device, the processor to execute the TWAMP communication module, the TWAMP communication module to set a current hopcount to a current value for the TWAMP test session, transmit a TWAMP test request packet to the reflector, the TWAMP test request packet having a destination IP address for the reflector and with the current hopcount, to receive an Internet Control Message Protocol (ICMP) time exceeded message from a transit node on the TWAMP E2E path, to determine that the transit node is the current hopcount away from the network device on the TWAMP E2E path, and to store an IP address of the transit node received in the ICMP time exceeded message in a sequence of IP addresses in an entry of a path table where each of a set of alternate TWAMP E2E paths are separate entries, the sequence of IP addresses representing a forward direction path in the set of alternate TWAMP E2E paths to the reflector, the set of alternate TWAMP E2E paths including the TWAMP E2E path.

8. The network device of claim 7, wherein the TWAMP communication module is further configured to transmit another TWAMP test request packet with the current hopcount incremented by one as compared to the TWAMP test request packet, and to store another IP address of another transit node received in another ICMP time exceeded message to the sequence of IP addresses representing the forward direction path in the set of alternate TWAMP E2E paths including the TWAMP E2E path.

9. The network device of claim 7, wherein the TWAMP communication module is further configured to make a routing decision between two other nodes for a first hop, wherein the routing decision is Equal Cost Multi Path (ECMP) based.

10. The network device of claim 7, wherein one IP address in the sequence of IP addresses is of a network device acting as an Equal Cost Multi Path (ECMP) point using IP based hashing to make forwarding decisions.

11. The network device of claim 9, wherein the TWAMP communication module is further configured to vary a source port of for a set of TWAMP test request packets to discover each ECMP path between the sender and reflector.

12. The network device of claim 7, wherein the TWAMP communication module is further configured to vary the current hopcount and source port of each TWAMP test packet to discover each node of each ECMP path between the sender and reflector.

13. A non-transitory machine-readable storage medium having stored therein a set of instructions, which when executed by a processor cause a network device to perform a method for performing Two-Way Active Measurement Protocol (TWAMP) based path discovery on a TWAMP end-to-end (E2E) path between a sender and a reflector of a TWAMP test session, the instructions further causing the network device to perform a set of operations comprising:
  setting a current hopcount to a current value for the TWAMP test session;
  transmitting, by the network device that is the sender for the TWAMP test session, a TWAMP test request packet to the reflector, the TWAMP test request packet having a destination IP address for the reflector and with the current hopcount;
  receiving, by the network device, an Internet Control Message Protocol (ICMP) time exceeded message from a transit node on the TWAMP E2E path;
  determining that the transit node is the current hopcount away from the network device on the TWAMP E2E path; and
  storing an IP address of the transit node received in the ICMP time exceeded message in a sequence of IP addresses in an entry of a path table where each of a set of alternate TWAMP E2E paths are separate entries, the sequence of IP addresses representing a forward direction path in the set of alternate TWAMP E2E paths to the reflector, the set of alternate TWAMP E2E paths including the TWAMP E2E path.

14. The non-transitory machine-readable storage medium of claim 13, having further instructions stored therein, which when executed cause the network device to perform further operations comprising:
  transmitting another TWAMP test request packet with the current hopcount incremented by one as compared to the TWAMP test request packet; and
  storing another IP address of another transit node received in another ICMP time exceeded message to the sequence of IP addresses representing the forward direction path in the set of alternate TWAMP E2E paths including the TWAMP E2E path.

15. The non-transitory machine-readable storage medium of claim 13, wherein the transmitting includes the network device making a routing decision between two other nodes for a first hop, wherein the routing decision is Equal Cost Multi Path (ECMP) based.

16. The non-transitory machine-readable storage medium of claim 13, wherein one IP address in the sequence of IP addresses is of a network device acting as an Equal Cost Multi Path (ECMP) point using IP based hashing to make forwarding decisions.

17. The non-transitory machine-readable storage medium of claim 15, having further instructions stored therein, which when executed cause the network device to perform further operations comprising:
  varying a source port for a set of TWAMP test request packets to discover each ECMP path between the sender and reflector.

18. The non-transitory machine-readable storage medium of claim 13, having further instructions stored therein, which when executed cause the network device to perform further operations comprising:
  varying the current hopcount and source port of each TWAMP test packet to discover each node of each ECMP path between the sender and reflector.

* * * * *